(12) United States Patent
Wipf

(10) Patent No.: US 6,712,690 B1
(45) Date of Patent: Mar. 30, 2004

(54) PORTABLE VENTILATING SYSTEM

(76) Inventor: Sam J. Wipf, 36562 102$^{nd}$ St., Forbes, ND (US) 58439-9027

( * ) Notice: Subject to any disclaimer, the term of this patent is extended or adjusted under 35 U.S.C. 154(b) by 176 days.

(21) Appl. No.: 10/004,144

(22) Filed: Oct. 30, 2001

(51) Int. Cl.$^7$ .............................. F24F 6/14; F24F 7/007
(52) U.S. Cl. ....................... 454/285; 119/448; 454/328; 454/329; 454/338
(58) Field of Search ................... 454/285, 328, 454/329, 337, 338; 119/448

(56) References Cited

U.S. PATENT DOCUMENTS

| | | |
|---|---|---|
| 2,628,020 A | 2/1953 | Koch |
| 3,069,091 A | 12/1962 | Giesse et al. |
| 3,306,533 A | 2/1967 | Vertrees et al. |
| 3,539,271 A | 11/1970 | Greenwood |
| D229,058 S | 11/1973 | Alms et al. |
| 4,026,469 A | 5/1977 | Frankel et al. |
| 4,169,508 A * | 10/1979 | Jauros et al. ................. 169/47 |
| 4,681,064 A | 7/1987 | Lilliston, Sr. et al. |
| 4,762,274 A * | 8/1988 | Burls et al. .................... 239/3 |
| RE33,638 E | 7/1991 | Lilliston et al. |
| 5,622,036 A * | 4/1997 | Hill ............................ 56/12.8 |
| 6,209,257 B1 * | 4/2001 | Nishimura .................... 47/1.7 |
| 6,302,332 B1 * | 10/2001 | Panneton et al. ............. 239/8 |

* cited by examiner

Primary Examiner—Harold Joyce

(57) ABSTRACT

The portable ventilating system of the invention includes a base adapted for being towed behind a prime mover, ground engaging apparatus for supporting the base frame in a manner permitting movement of the base over the ground, a fan assembly mounted on the base and having an impeller for creating an air flow, and power transfer apparatus for rotating the impeller of the fan assembly. The power transfer apparatus is connectable to and drivable by a power take off apparatus of the prime mover.

17 Claims, 6 Drawing Sheets

PORTABLE VENTILATING SYSTEM

BACKGROUND OF THE INVENTION

1. Field of the Invention

The present invention relates to ventilation systems and more particularly pertains to a new portable ventilating system for providing temporary and highly effective ventilation for a building during warm weather that may be easily removed when enhanced ventilation is not need, such as times of cold weather.

2. Description of the Prior Art

Livestock confinement facilities located in enclosed buildings require significant amounts of ventilating air movement through the interior of the building, especially in warm weather conditions when the heat can make the conditions in the building interior unfavorable for the livestock as well and the persons working in the building. However, in areas where the climate varies between hot weather and cold weather, large volume ventilation is not required throughout the year. Forming large ventilation openings in the building for permitting that large scale ventilation has drawbacks, as these openings must be securely closed in times of colder weather so that heated air does not escape from the interior of the building.

For example, a turkey confinement building often has ventilation openings that extend horizontally as a slot along a middle portion of the side walls of the building. While these openings tend to provide some passive cross ventilation through the interior of the building, the passive ventilation alone is often insufficient, especially during times of relatively warm weather. Further, if the openings are increased in size, maintaining an adequate temperature during times of colder weather is made more difficult, especially if the openings in the structure cannot be adequately closed to minimize exposure of the interior of the building to exterior environmental conditions.

Thus, there has been a need for a system for ventilating large open buildings such as livestock confinement facilities that can produce sufficient ventilation when the exterior environmental conditions are warm, while permitting the interior of the building to be sufficiently isolated from the exterior environmental conditions when colder temperatures prevail.

SUMMARY OF THE INVENTION

In view of the foregoing disadvantages inherent in the known types of ventilation systems now present in the prior art, the present invention provides a new portable ventilating system construction wherein the same can be utilized for providing temporary and highly effective ventilation for a building during warm weather that may be easily removed when enhanced ventilation is not need, such as times of cold weather.

To attain this, the present invention generally comprises a base adapted for being towed behind a prime mover, ground engaging means for supporting the base frame in a manner permitting movement of the base over the ground, a fan assembly mounted on the base and having an impeller for creating an air flow, and power transfer means for rotating the impeller of the fan assembly. The power transfer means is connectable to and drivable by a power take off apparatus of the prime mover.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
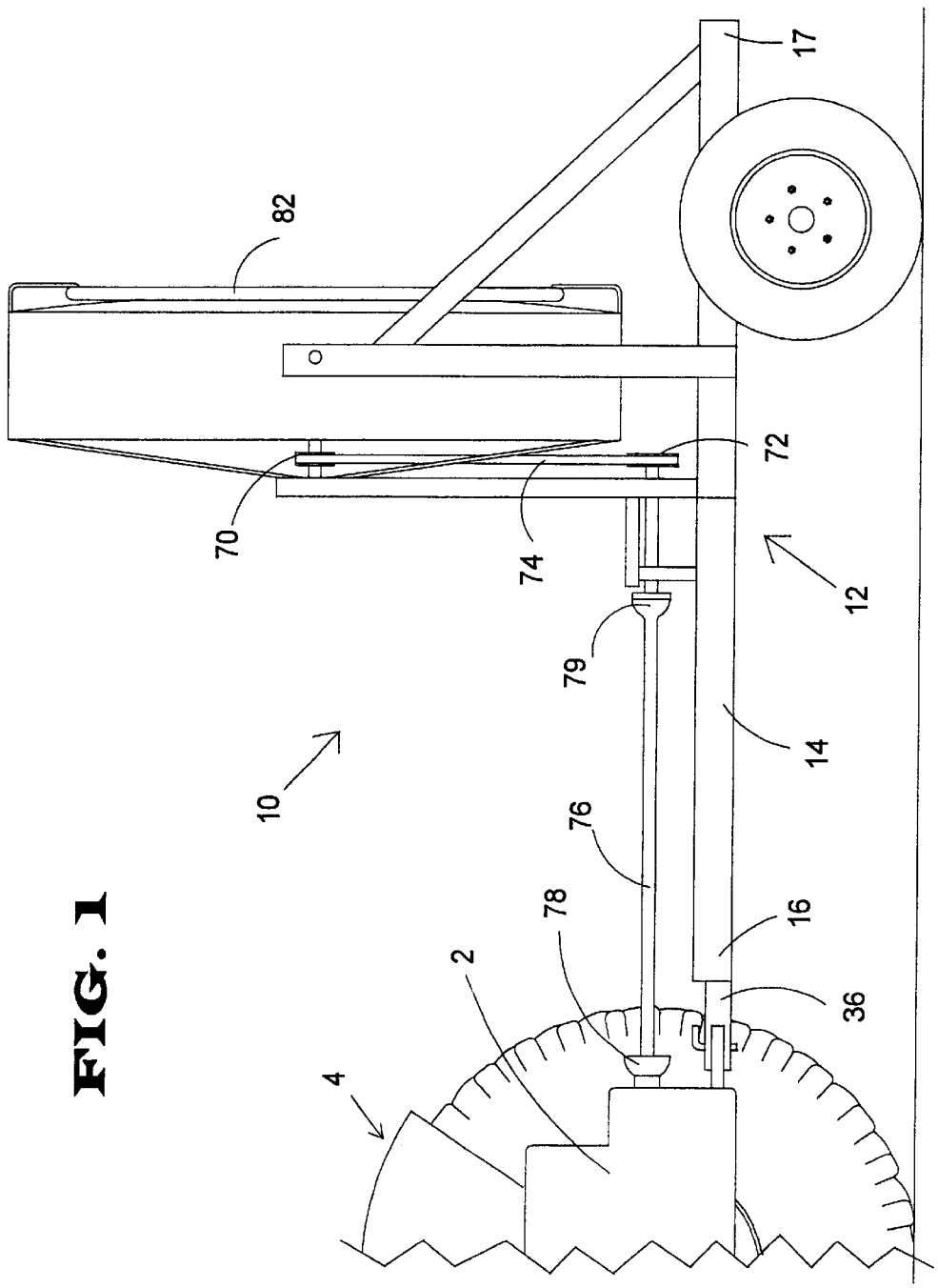
FIG. 1 is a schematic side view of a new portable ventilating system according to the present invention.
Figure 2:
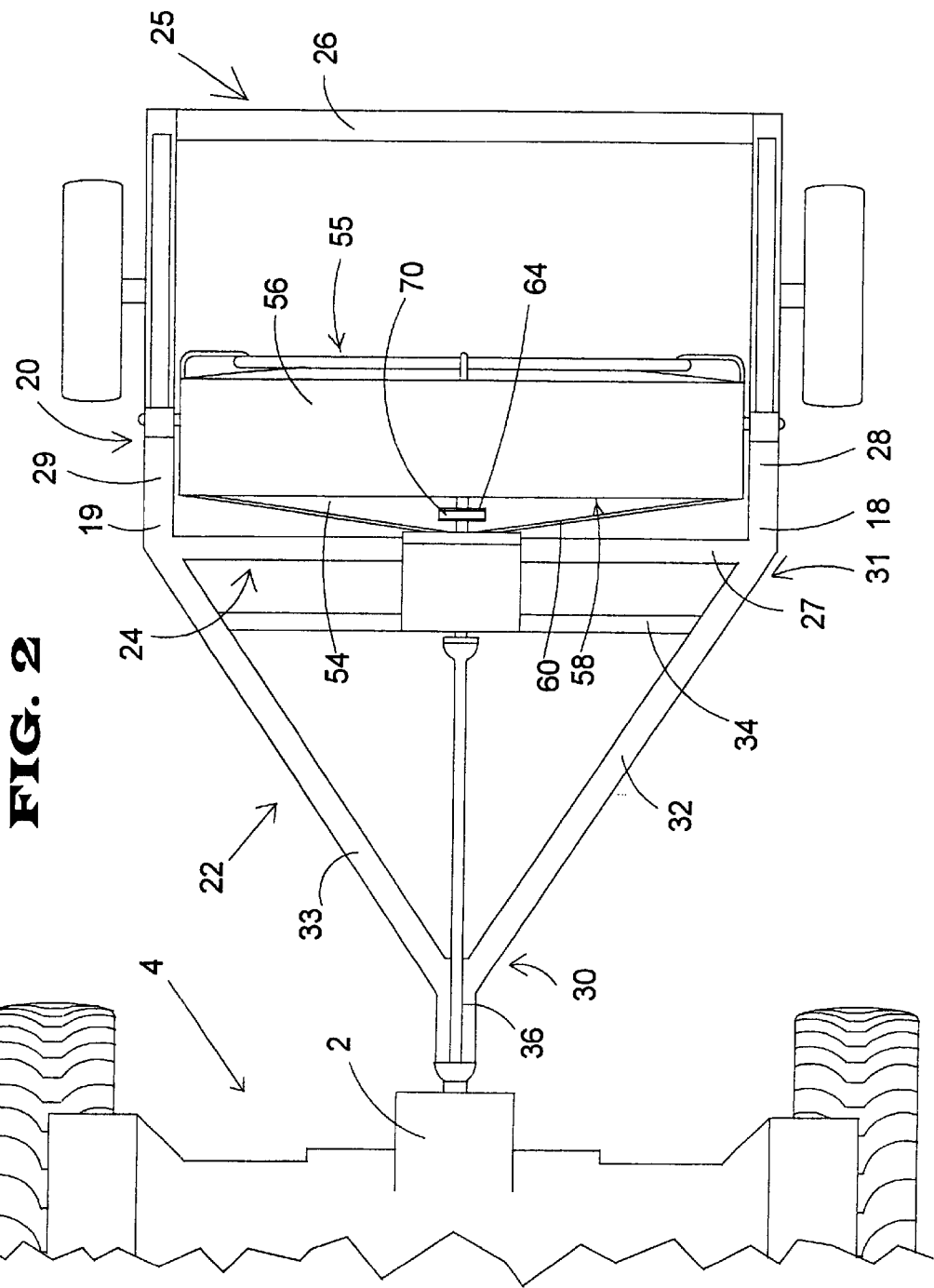
FIG. 2 is a schematic top view of the present invention.
Figure 3:
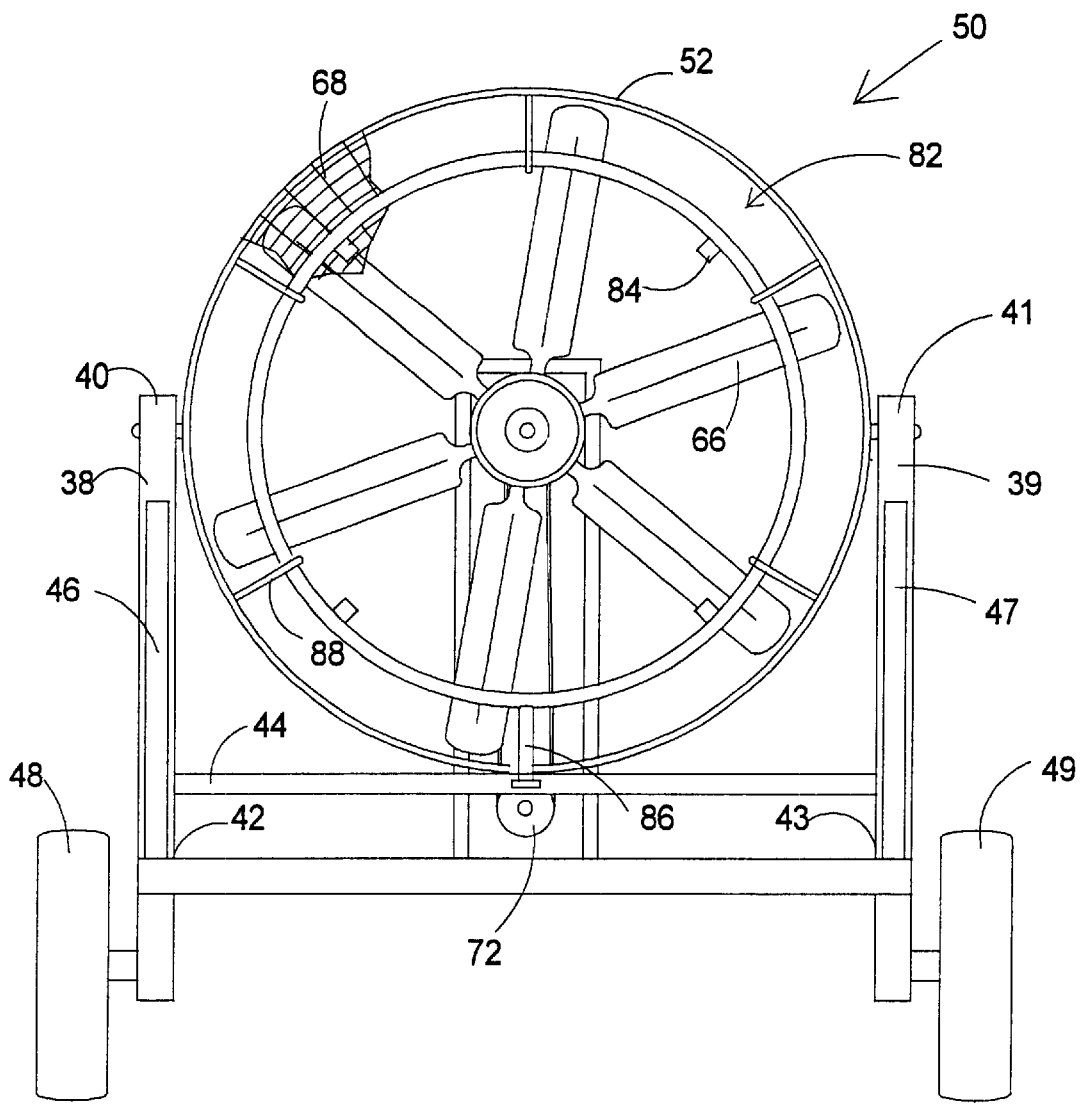
FIG. 3 is a schematic rear view of the present invention.

With reference now to the drawings, and in particular to FIGS. 1 through 6 thereof, a new portable ventilating system embodying the principles and concepts of the present invention and generally designated by the reference numeral 10 will be described.

The invention contemplates a portable ventilating system 10 that is especially useful and suitable for ventilating a livestock confinement facility, although other buildings with relatively large, open interiors that typically do not have conventional or large scale ventilation systems.

The portable ventilating system 10 includes a base 12, and the base 12 may comprise a perimeter frame 14. The perimeter frame 14 may have a front 16, a rear 17, and a pair of sides 18, 19 that extend between the front and rear of the frame. The perimeter frame may include a rear portion 20 and a forward tongue portion 22. The rear portion 20 may have a front 24 and a rear 25. The rear portion 20 may comprise a rear member 26 located at the rear 25 of the rear portion. The rear portion 20 may also comprise a front member 27 that is located at the front 24 of the rear portion. The rear portion 20 may also comprise a pair of side members 28, 29 that extend between the front and rear members. Optionally, the front 27, rear 26, and side members 28, 29 may form a substantially rectangular shape.

The forward tongue portion 22 is provided for removably attaching to a prime mover, such as, for example, an agricultural tractor. The front tongue portion may have a front 30 and a rear 31. The forward tongue portion may extend forwardly from the front 24 of the rear portion 20. The forward tongue portion 22 may comprise a pair of converging side members 32, 33 that converge together at the front 30 of forward tongue portion. The forward tongue portion may optionally include an intermediate member 34 that extends between the converging side members 32, 33. The forward tongue portion may also include a hitch assembly 36 located at the front of the forward tongue portion.

The base 12 may also include a pair of stanchions 38, 39 that are mounted on and extend upwardly from the perimeter frame 14. Each of the stanchions 38, 39 has upper ends 40, 41. The stanchions each have lower ends 42, 43 that is mounted on the rear portion 20 of the perimeter frame. A cross member 44 may extend between the stanchions 38, 39. The base 12 may further include a pair of brace members 46, 47 for bracing the pair of stanchions 38, 39. Each of the brace members may have an upper end mounted on one of the stanchions and a lower end mounted on the perimeter frame.

The portable ventilating system of the invention may also include ground engaging means for supporting the base frame in a manner that permits movement of the base over a ground surface. The ground engaging means may comprise a pair of wheels 48, 49 mounted on the base, or optionally on an axle mounted on the base. Significantly, the ground engaging means permit the system to be easily moved by a prime mover such as, for example, an agricultural tractor.

The portable ventilating system also includes a fan assembly 50 for creating a front to rear air flow. The fan assembly 50 may be mounted on the base 12. The fan assembly 50 may include a shroud 52 that may be mounted on the base. The shroud may have a front opening 54 and a rear opening 55. The shroud may include a perimeter wall 56, which may be substantially annular in shape. The shroud may also include a shroud frame 58 for supporting the perimeter wall. The shroud frame 58 may be located at or near the front opening 54 of the perimeter wall. The shroud frame 58 may include a plurality of radial members 60 that extend from the perimeter wall of the shroud toward a center of the shroud. Optionally, the radial members, or additional radial members, may extend inwardly and rearwardly from the perimeter wall.

The fan assembly may also include an axle 64 may be mounted on the shroud in a manner permitting rotation of the axle with respect to the shroud. The radial members may support the axle. The axle 64 may extend through the front opening 54 of the perimeter wall of the shroud. The axle has a forward and rearward end.

The fan assembly may also include an impeller 66 is rotationally mounted on the shroud for producing a flow of air through the shroud when the impeller is rotated. The impeller 66 may be mounted on the rearward end of the axle 64 for rotating with the axle.

The fan assembly may also include at least one grill 68 mounted on the shroud 52 at one of the openings 54, 55. Optionally, a grill may be mounted at each of the front and rear openings.

The portable ventilating system 10 may further include power transfer assembly for rotating the impeller of the fan assembly, with the power transfer assembly most preferably being drivable by a power take off apparatus 2 of a prime mover 4. The power transfer assembly may comprise a driven pulley 70 that is mounted on the axle 64 of the fan assembly, and the driven pulley may be located at the forward end of the axle. A driver pulley 72 may be mounted for rotation on the base. An endless belt 74 extends about the driver and driven pulleys for transferring rotational movement of the driver pulley to the driven pulley. A transfer shaft 76 having a forward end 78 and a rearward end 79 may be operably coupled to the driver pulley 72 such that rotation of the transfer shaft is transferred to the driver pulley. The forward end 78 of the transfer shaft is adapted to be coupled to the power take off apparatus 2 of the prime mover 4.

Optionally, the portable ventilating system 10 may include a misting assembly 80 for producing a fluid mist in the air flow created by the fan assembly. The misting assembly 80 may be mounted on the shroud of the fan assembly adjacent the rearward opening of the shroud. The misting assembly 80 may include a conduit 82 that extends along a perimeter region of the rear opening the shroud. The conduit 82 may be substantially annular in shape. The conduit 82 may have a lumen through which fluid such as, for example, water, is passed. A plurality of nozzles 84 may be mounted on the conduit 82, with each of the nozzles being in fluid communication with the conduit such that fluid flowing in the conduit under pressure is forced through the nozzles. Each of the nozzles 84 may have a spray passage in fluid communication with the lumen of the conduit. The misting assembly may also include a supply conduit 86 in fluid communication with the conduit 82 through which fluid may flow to the lumen of the conduit. A first end of the supply conduit 86 is connected to the conduit and a second end of the supply conduit may be provided with connection means for connecting to a supply hose. The misting assembly may also include a plurality of conduit supports 88 that supporting the conduit on the shroud. Each of the conduit supports 88 may be mounted on the perimeter wall of the shroud. Each of the conduit supports 88 may extend radially inward from the perimeter wall toward the rear opening 55 of the shroud, and each of the conduit supports may be generally L-shaped.

In one preferred embodiment of the invention, the fan assembly 50 is located forwardly of the ground engaging means, wherein the stanchions supporting the fan assembly are mounted on the base at a location forward of the ground engaging means.

The invention also contemplates use of the system in a method of ventilating a building, such as, for example, a livestock confinement facility. The livestock confinement facility may comprise a building with an interior and an exterior. The building has an entry door opening between the interior and exterior of the building. The entry door opening may be sized such that a vehicle is movable through the entry door opening, and the building may have a door for selectively closing the entry door opening. The building may have at least one ventilation opening in addition to the entry door opening to permit air to move from the interior of the building to the exterior.

A prime mover (such as, for example, a building) may be provided that has a power take off assembly for providing rotational power to the portable ventilating system of the invention. The power transfer assembly of the portable ventilating system may be connected to the power take off assembly of the prime mover.

The door of the building may be opened to expose the entry door opening, and the portable ventilation system may be positioned in the entry door opening with the door in an open condition. Power may be provided to the fan assembly through the power transfer assembly of the ventilation system from the power take off assembly of the prime mover. The ventilation system of the invention may thus be employed to push air into the interior of the building through the entry door opening so that an air flow through the building is created that moves out of the ventilation opening in the building. Once the ventilation is no longer desired, the portable ventilation system may be removed, such as by towing from the entry door opening by the same prime mover that powered the fan assembly, and the door may be closed over the entry door opening.

In this manner, air may be pushed air into the interior of the building from the exterior by the ventilation system to form an air flow into the building through the entry door opening and out of the building through the at least one ventilation opening.

The portability of the system permits the system to be removably and temporarily positioned in front of or in a door opening of a building when ventilation is desired, and ingress into and egress out of the building is not permanently blocked. The system may thus take advantage of what is typically the largest opening in a building, the door, and especially a door of the type permitting a vehicle to access the interior of the building. Further, the portable ventilation system may be easily moved between buildings for periodic ventilation of the buildings when continuous ventilation of the buildings is not required.

The portable ventilation system of this embodiment does not require its own dedicated power source, such as a motor mounted on the base, and instead utilizes the power of the primer mover. The attachment of the system to the prime mover during times of use also serves to stabilize and anchor the ventilation system against movement induced by the significant force of the air being moved by the fan assembly, especially as the air is blown into the relatively closed interior of the building through the entry door opening, which may provide enough resistance to air flow to cause the ventilation system to move forward away from the building.

One optional base 90 of the invention (see FIGS. 4 through 6) is adapted for removably resting on a ground surface. The base 90 may comprise a perimeter frame 92 having a front, a rear, and a pair of sides extending between the front and rear of the frame. The perimeter frame 92 may comprise a rear member 94 located at the rear, a front member 95 located at the front, and a pair of side members 96, 97 extending between the front and rear members. The front, rear, and side members may form a substantially rectangular shape. The base may also include a forward wall 98 that is mounted on the perimeter frame toward the front thereof.

The invention may include optional mounting structures for removably mounting the base on a prime mover (see FIGS. 4 through 6), such as, for example, a fork lift or a loader, particularly of the small skid steer variety.

Optionally, the mounting structure may comprise a mounting flange structure 100 formed on the base for removably mounting to the mounting apparatus on a prime mover. The particular mounting apparatus of the prime mover may vary from manufacturer to manufacturer, and the mounting flange structure of the base may be varied to attach to the various different mounting apparatus designs employed.

Optionally, the mounting structure may comprise a receiving structure 102 for removably receiving a portion of a fork mounted on a prime mover, such as a fork lift. The receiving structure 102 may comprise a channel 104 formed in the base 90 for receiving a portion of the fork. The receiving structure may comprise a pair of the channels 104, 105 formed in the base at laterally-spaced locations for each receiving a portion of one fork of a pair of forks of the prime mover. The channels 104, 105 may be located toward a bottom of the base 90. The channels 104, 105 may extend through the forward wall 98 of the base 90. Utilizing this optional structure, the invention may be lifted during movement of the invention, and may also be lifted from a ground level to raised openings in a structure, such as an opening into a hay loft or on a raised loading dock structure.

As a further option, a power source 106 may be provided for rotating the impeller of the fan assembly. The power source 106 may comprise an electric motor, which may be mounted on the base. As a further option, the power source 106 may comprise a hydraulic motor that may be linked by conduits to a hydraulic pump of the prime mover to thereby power the fan assembly by the engine of the prime mover through hydraulic fluid flow. Utilizing this optional structure, the invention may be separated from the prime mover for periods of time while air circulation is desired.

Figure 4:
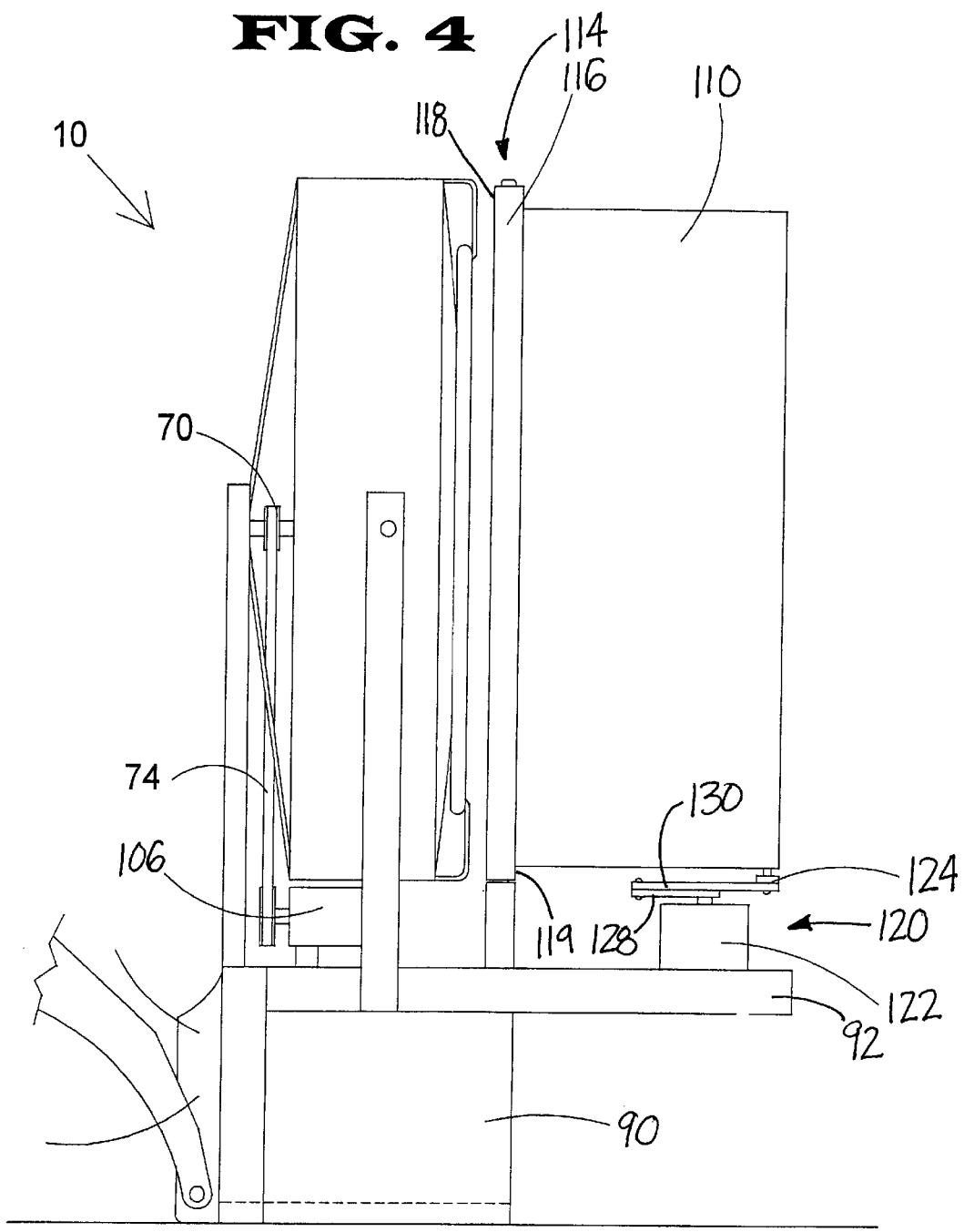
FIG. 4 is a schematic side view of an embodiment of the portable ventilating system having optional features including a support base, baffle panels, and a power source.
Figure 5:
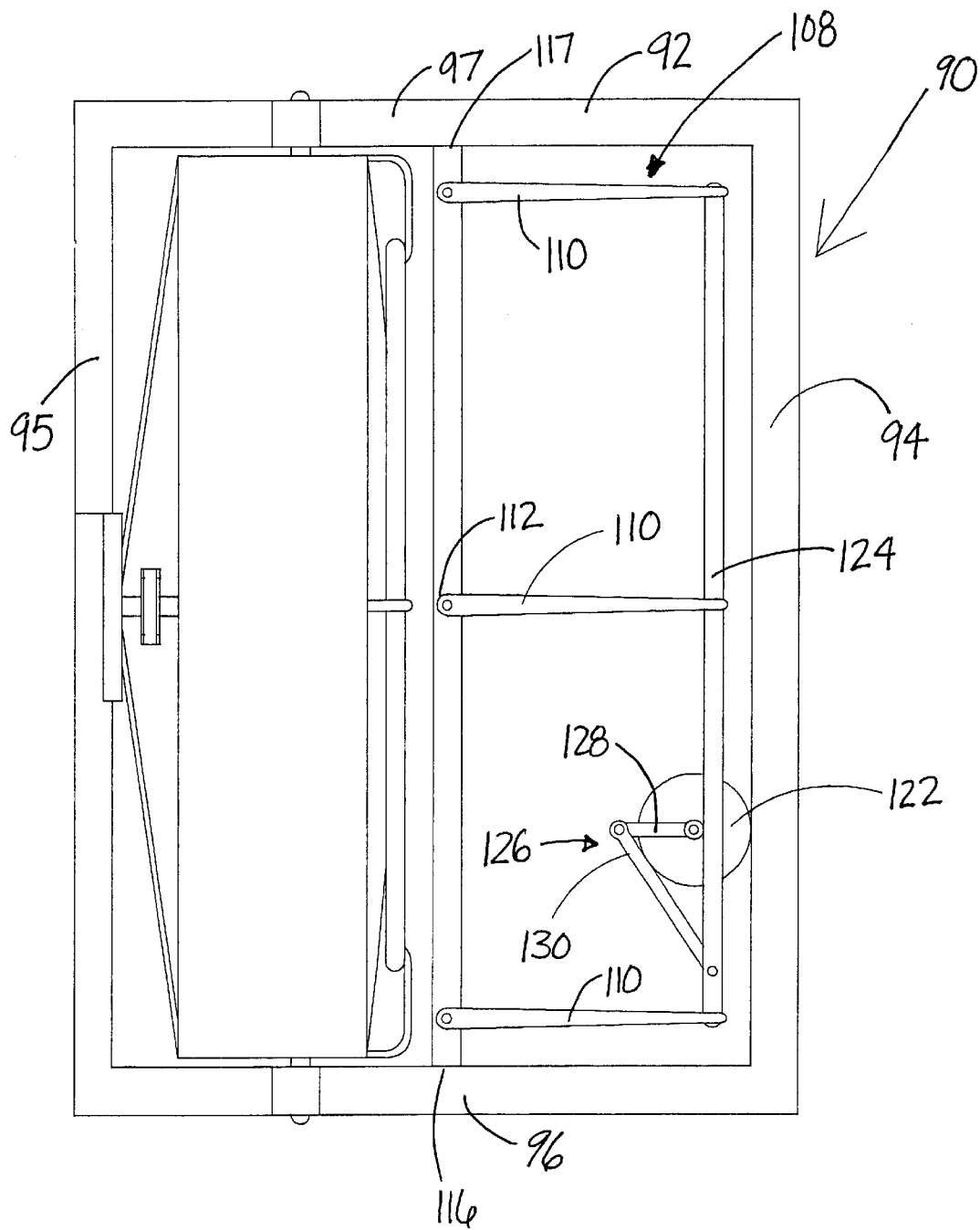
FIG. 5 is a schematic top view of the embodiment of the system shown in FIG. 4.
Figure 6:
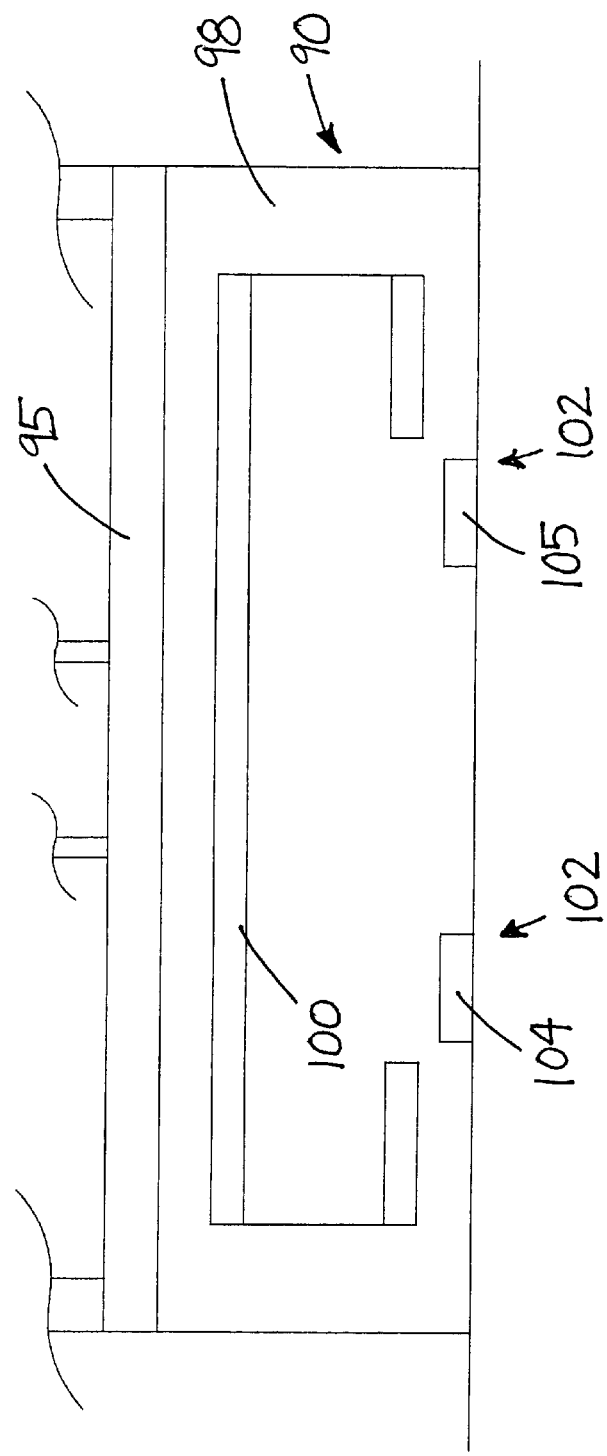
FIG. 6 is a schematic rear view of a lower portion of the embodiment of FIG. 4.

As another option, an air directing assembly 108 for directing an air flow created by the fan assembly (see FIGS. 4 through 6). The air directing assembly 108 may comprise a plurality of baffle panels 110 that are positioned rearward of the fan assembly 50 for intercepting air flowing from the fan assembly. Each of the plurality of baffle panels 110 may be pivotally movable with respect to the fan assembly to permit directing the air exiting the fan assembly. The baffle panels 110 may each have a forward edge about which the panel pivots. The air directing assembly may also include a baffle panel support structure 114 for supporting the baffle panels. The baffle panels 110 may be pivotally mounted on the support structure 114 for each pivoting about the forward edge 112 of the baffle panel. The support structure 114 may be mounted on the base. The support structure 114 may extend upwardly from the base, and may include a pair of upstanding members 116, 117 and a pair of lateral members 118, 119 that extend between the upstanding members. The baffle panels 110 may be pivotally mounted on the lateral members 118, 119.

The air directing assembly 108 may also include structure for causing oscillating movement of the baffle panels. The oscillating structure 120 may include a motor 122 for oscillating the baffle panels 110. A connector member 124 may be provided for connecting the baffle panels together such that movement of the connector member produces substantially coincident pivotal movement of each of the baffle panels. The connector member 124 may be mounted on each of the baffle panels at a distance from the pivot mounting of the baffle panel on the support structure 114. An arm assembly 126 may connect the motor 122 to the connector member 124. The arm assembly 126 may comprise a first arm member 128 and a second arm member 130. The first arm member 128 may have a first end pivotally mounted on a rotational shaft of the motor 122 and a second end that is pivotally mounted on the second arm member 130. The second arm member 130 may have a first end that is pivotally mounted on the connector member 124.

The air directing assembly 108 may thus provide a side to side movement of the air flowing from the fan assembly, such that placement of the invention in a door opening of a structure produces air movement in a greater portion of the interior of the structure.

With respect to the above description then, it is to be realized that the optimum dimensional relationships for the parts of the invention, to include variations in size, materials, shape, form, function and manner of operation, assembly and use are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A portable system for ventilating a livestock confinement facility, the system comprising:
    a base adapted for being towed behind a prime mover, the base having a front for positioning toward the prime mover when being towed by the prime mover and a rear for positioning away from the prime mover when towed by the prime mover;
    ground engaging means for supporting the base frame in a manner permitting movement of the base over the ground;
    a fan assembly mounted on the base and having an impeller for creating an air flow, the fan assembly being configured to direct the air flow towards the rear of the base and away from the prime mover when the base is being towed by the prime mover; and
    power transfer means for rotating the impeller of the fan assembly, the power transfer means being connectable to and drivable by a power take off apparatus of the prime mover.

2. The system of claim 1 wherein the power transfer means comprises:
    a driven pulley being mounted on the impeller of the fan assembly;
    a driver pulley mounted for rotation on the base;
    an endless belt extending about the driver and driven pulleys for transferring rotational movement of the driver pulley to the driven pulley; and
    a transfer shaft having a forward end and a rearward end, the rearward end being operably coupled to the driver pulley such that rotation of the transfer shaft is transferred to the driver pulley, the forward end of the transfer shaft being couplable to the power take off apparatus of the prime mover.

3. The system of claim 1 wherein the ground engaging means comprises a pair of wheels mounted on the base.

4. The system of claim 1 wherein the fan assembly comprises a shroud mounted on the base, the shroud having a front opening and a rear opening, the shroud including a perimeter wall, the perimeter wall being substantially annular, the impeller being rotationally mounted on the shroud for producing a flow of air through the shroud when the impeller is rotated.

5. The system of claim 1 additionally comprising misting means for producing a fluid mist in the air flow created by the fan assembly.

6. The system of claim 5 wherein the misting means is mounted on a shroud of the fan assembly adjacent a rearward opening of the shroud.

7. The system of claim 5 wherein the misting means comprises:
    a conduit extending along a perimeter region of the fan assembly, the conduit having a lumen through which fluid is passable;
    a plurality of nozzles mounted on the conduit, each of the nozzles being in fluid communication with the conduit such that fluid flowing in the conduit under pressure is forced through the nozzles.

8. The system of claim 1 wherein the fan assembly is located forwardly of the ground engaging means.

9. The system of claim 8 wherein the base additionally comprises stanchions supporting the fan assembly on the base, the stanchions being mounted on a perimeter frame of the base at a location forward of the ground engaging means.

10. The system of claim 1 additionally comprising an air directing assembly comprising a plurality of pivotable baffle panels positioned adjacent to an outlet of the fan assembly for directing an air flow created by the fan assembly.

11. The system of claim 1 wherein the fan assembly has an inlet and an outlet, the inlet being directed toward the front of the base and the outlet being positioned toward the rear of the base.

12. The system of claim 1 wherein the fan assembly has an inlet and an outlet, the inlet and the outlet of the fan assembly being centered on a common axis.

13. The system of claim 12 wherein the common axis is substantially horizontally oriented.

14. The system of claim 12 wherein the air flow is directed along the common axis.

15. A portable system for ventilating a livestock confinement facility, the system comprising:
    a base adapted for being towed behind a prime mover;
    ground engaging means for supporting the base frame in a manner permitting movement of the base over the ground;
    a fan assembly mounted on the base and having an impeller for creating an air flow; and
    power transfer means for rotating the impeller of the fan assembly, the power transfer means being connectable to and drivable by a power take off apparatus of the prime mover;
    an air directing assembly for directing an air flow created by the fan assembly, wherein the air directing assembly comprises:
        a plurality of baffle panels positioned rearward of the fan assembly for intercepting air flowing from the fan assembly, each of the plurality of baffle panels being pivotal with respect to the fan assembly to permit directing of the air exiting the fan assembly;
        a baffle panel support structure for supporting the baffle panels, the baffle panels being pivotally mounted on the support structure for each pivoting about a pivot axis, the support structure being mounted on the base, the support structure extending upwardly from the base; and
        oscillating means for producing oscillating pivotal movement of the baffle panels.

16. A portable system for ventilating a livestock confinement facility, the system comprising:

a base adapted for being towed behind a prime mover;

ground engaging means for supporting the base frame in a manner permitting movement of the base over the ground;

a fan assembly mounted on the base and having an impeller for creating an air flow; and power transfer means for rotating the impeller of the fan assembly, the power transfer means being connectable to and drivable by a power take off apparatus of the prime mover;

wherein the base comprises:
   a perimeter frame having a front, a rear, and a pair of sides extending between the front and rear of the frame, the perimeter frame comprising:
      a rear portion having a front and a rear, a rear member located at the rear of the rear portion, a front member located at the front of the rear portion, a pair of side members extending between the front and rear members, the front, rear, and side members forming a substantially rectangular shape; and
      a forward tongue portion for removably attaching to a prime mover, the front tongue portion having a front and a rear, the forward tongue portion extending forwardly from the front of the rear portion, the forward tongue portion including a pair of converging side members converging at a front of forward tongue portion, the forward tongue portion including an intermediate member extending between the converging side members, the forward tongue portion including a hitch assembly located at the front of the forward tongue portion,
   a pair of stanchions extending upwardly from the perimeter frame, each of the stanchions having upper ends, the stanchions having lower ends mounted on the rear portion of the perimeter frame;
   a cross member extending between the stanchions;
   a pair of brace members for bracing the pair of stanchions, each of the brace members having an upper end mounted on one of the stanchions and a lower end mounted on the perimeter frame;
wherein the ground engaging means comprises a pair of wheels mounted on the base;
wherein the fan assembly comprises:
   a shroud mounted on the base, the shroud having a front opening and a rear opening, the shroud including a perimeter wall, the perimeter wall being substantially annular, the shroud including a shroud frame for supporting the perimeter wall, the shroud frame being located at the front opening of the perimeter wall, the shroud frame including a plurality of radial members extending from the perimeter wall of the shroud toward a center of the shroud, the radial members extending inwardly and rearwardly from the perimeter wall;
   an axle mounted on the shroud in a manner permitting rotation of the axle with respect to the shroud, the axle extending through the front opening of the perimeter wall of the shroud, the axle having a forward and rearward end;
   an impeller rotationally mounted on the shroud for producing a flow of air through the shroud when the impeller is rotated, the impeller being mounted on the axle for rotating with the axle, the impeller being mounted on the rearward end of the axle;
   at least one grill mounted on the shroud at one of the openings of the shroud;
wherein the power transfer means comprises:
   a driven pulley being mounted on the axle of the fan assembly, the driven pulley being located at the forward end of the axle;
   a driver pulley mounted for rotation on the base;
   an endless belt extending about the driver and driven pulleys for transferring rotational movement of the driver pulley to the driven pulley;
   a transfer shaft having a forward end and a rearward end, the rearward end being operably coupled to the driver pulley such that rotation of the transfer shaft is transferred to the driver pulley, the forward end of the transfer shaft being couplable to the power take off apparatus of the prime mover;
misting means for producing a fluid mist in an air flow created by the fan assembly, the misting means being mounted on the shroud of the fan assembly adjacent the rearward opening of the shroud, the misting means comprising:
   a conduit extending along a perimeter region of the rearward opening the shroud, the conduit being substantially annular, the conduit having a lumen through which fluid is passable;
   a plurality of nozzles mounted on the conduit, each of the nozzles being in fluid communication with the conduit such that fluid flowing in the conduit under pressure is forced through the nozzles, each of the nozzles having a spray passage in fluid communication with the lumen of the conduit;
   a supply conduit in fluid communication with the conduit through which fluid may flow to the lumen of the conduit, a first end of the supply conduit being connected to the conduit and a second end of the supply conduit having connection means for connecting to a supply hose; and
   a plurality of conduit supports supporting the conduit on the shroud, each of the conduit supports being mounted on the perimeter wall of the shroud, each of the conduit supports extending radially inward from the perimeter wall toward the rearward opening of the shroud, each of the conduit supports being generally L-shaped; and
wherein the fan assembly is located forwardly of the ground engaging means, wherein the stanchions supporting the fan assembly are mounted on the base at a location forward of the ground engaging means.

17. A method for ventilating a livestock confinement facility, comprising:

providing a livestock confinement building with an interior and an exterior, the building having a entry door opening between the interior and exterior of the building, the entry door opening being sized such that a vehicle is movable through the entry door opening, the building having a door for selectively closing the entry door opening, the building having at least one ventilation opening in addition to the entry door opening to permit air to move from the interior of the building to the exterior;

providing a portable ventilating system comprising:
   a base adapted for being towed behind a prime mover;
   ground engaging means for supporting the base frame in a manner permitting movement of the base over the ground;
   a fan assembly mounted on the base and having an impeller for creating an air flow; and power transfer means for rotating the impeller of the fan assembly, the power transfer means being connectable to and drivable by a power take off apparatus of the prime mover;

providing a prime mover with a power take off assembly for providing rotational power to the portable ventilating system;

connecting the power means of the portable ventilating system to the power take off assembly of the prime mover;

opening the door of the building with respect to the entry door opening;

positioning the ventilating system in the entry door opening in an open condition;

providing power to the ventilating system from the power take off assembly of the prime mover;

pushing air into the interior of the building from the exterior by the portable ventilating system to form an air flow into the building through the entry door opening and out of the building through the at least one ventilation opening.

* * * * *